(12) United States Patent
Boyer et al.

(10) Patent No.: US 8,296,599 B1
(45) Date of Patent: Oct. 23, 2012

(54) SYSTEM AND METHOD FOR IMPLEMENTING CLUSTERED NETWORK FILE SYSTEM LOCK MANAGEMENT

(75) Inventors: Brad Boyer, San Jose, CA (US); Meher Shah, Newark, CA (US)

(73) Assignee: Symantec Corporation, Mountain View, CA (US)

( * ) Notice: Subject to any disclaimer, the term of this patent is extended or adjusted under 35 U.S.C. 154(b) by 156 days.

(21) Appl. No.: 12/495,791

(22) Filed: Jun. 30, 2009

(51) Int. Cl.
*G06F 11/00* (2006.01)

(52) U.S. Cl. ...................................... 714/4.11; 714/4.12

(58) Field of Classification Search ................. 714/4.11, 714/4.12
See application file for complete search history.

(56) References Cited

U.S. PATENT DOCUMENTS

| | | | |
|---|---|---|---|
| 6,163,855 A * | 12/2000 | Shrivastava et al. | 714/4.4 |
| 6,249,879 B1 * | 6/2001 | Walker et al. | 714/11 |
| 6,990,608 B2 * | 1/2006 | Wisler et al. | 714/13 |
| 7,356,531 B1 * | 4/2008 | Popelka et al. | 707/999.008 |
| 7,899,895 B2 * | 3/2011 | Bish et al. | 709/223 |
| 2004/0220931 A1 * | 11/2004 | Guthridge et al. | 707/8 |

* cited by examiner

*Primary Examiner* — Yolanda L Wilson
(74) *Attorney, Agent, or Firm* — Campbell Stephenson LLP

(57) ABSTRACT

A system and method for implementing clustered network file system lock management is provided. A failure of a first server node among a collection of nodes is detected. The first server node includes lock status data. The lock status data grants a first client exclusive access to data stored on a server storage device. The server storage device is coupled to the collection of server nodes. The lock status data is transferred to a second server node among the collection of server nodes. The first client is granted exclusive access to data stored on the server storage device, based on the lock status data transferred to the second server node from the first server node, in response to the transferring. Lock requests from the collection of clients are accepted, in response to the transferring.

18 Claims, 6 Drawing Sheets

SYSTEM AND METHOD FOR IMPLEMENTING CLUSTERED NETWORK FILE SYSTEM LOCK MANAGEMENT

FIELD OF THE INVENTION

This invention relates to data processing systems, and, more particularly, to a system and method for managing failover in networked data processing systems.

DESCRIPTION OF THE RELATED ART

In order to provide widespread access to a data store, modern data processing systems are coupled to a local area network (LAN) or a wide-area network (WAN) such as the Internet. For example, clients can connect to the Internet to send data requests to a remote server. The server, which is coupled to a data store, services the data requests and sends responses back to the clients via the Internet. However, in the event that the server becomes unavailable due to server failure or server maintenance, client access to the data store is lost. In this case, the server is a single point of failure. Some networked data processing systems implement multiple server nodes as a server cluster whereby one server node serves as a backup server node in the event another server node becomes unavailable.

Multiple server nodes sharing access to the same data store present certain challenges to, for example, the determination of how to update data in the data store. For example, multiple clients can request write access to the same data location in the data store via different server nodes at the same time. Thus, the data stored in the data location can become corrupted if multiple clients can write data to the same data location at any time. Thus, there is a need for an improved system and method for managing a networked data processing system that provides access to data for multiple clients.

SUMMARY OF THE INVENTION

A system and method for implementing clustered network file system lock management is provided. A failure of a first server node among a collection of nodes is detected. The first server node includes lock status data. The lock status data grants a first client exclusive access to data stored on a server storage device. The server storage device is coupled to the collection of server nodes. The lock status data is transferred to a second server node among the collection of server nodes. The first client is granted exclusive access to data stored on the server storage device, based on the lock status data transferred to the second server node from the first server node, in response to the transferring. Lock requests from the collection of clients are accepted, in response to the transferring.

The foregoing is a summary and thus contains, by necessity, simplifications, generalizations and omissions of detail; consequently those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features and advantages made apparent to those skilled in the art by referencing the accompanying drawings.

DETAILED DESCRIPTION

Introduction

Figure 1:
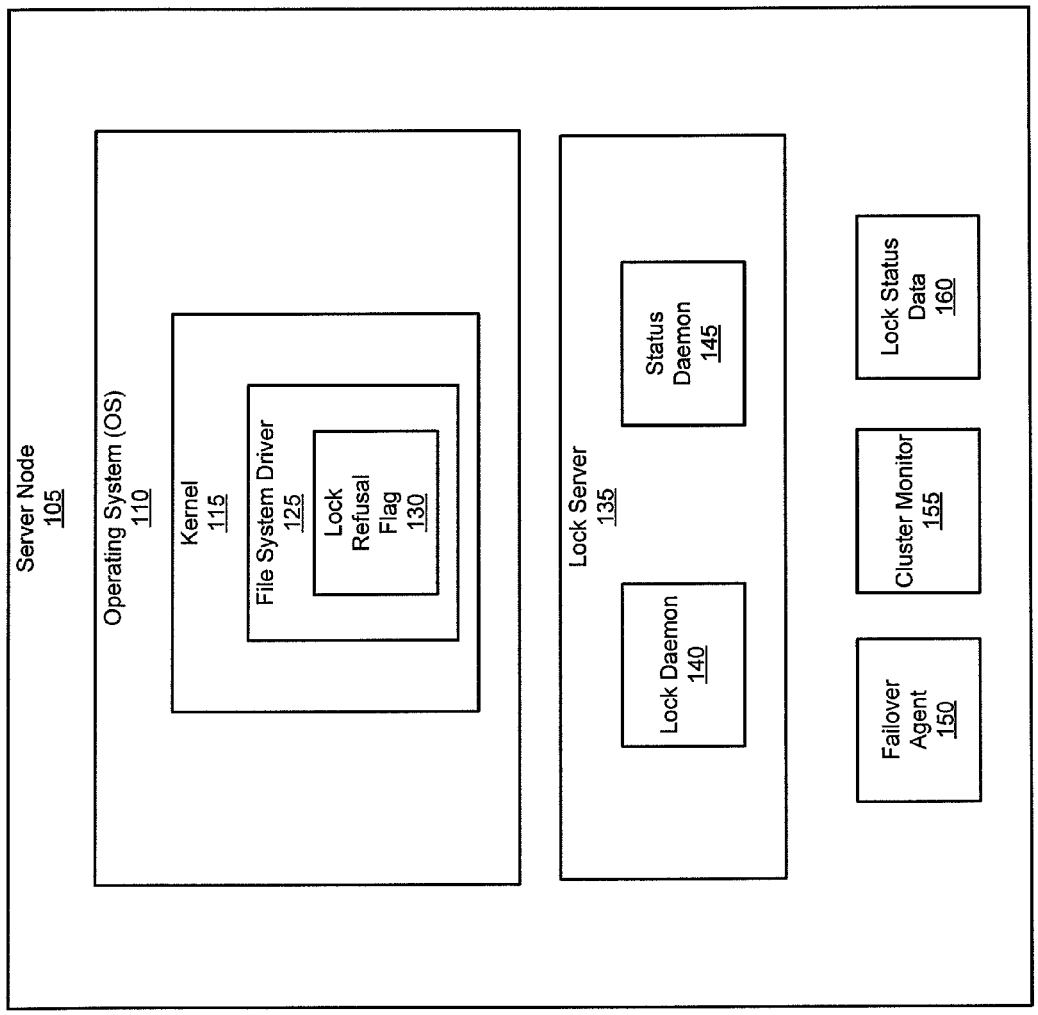
FIG. 1 is a block diagram of a server node within a server cluster for processing and granting lock requests from clients, according to one embodiment.

One technique for managing multiple data requests to the same data location in the networked data processing system involves the use of locks. When there are many clients vying for access to a single data storage location in a data store, using locks enforces limits on access to the data storage location. For example, a first client requests access to a data location in the data store. A lock server grants a lock to the first client. The lock prevents a second client from acquiring a lock on the data location before the first client relinquishes the lock on the data location.

The use of locks is appropriate for guarding against data corruption in a typical network file system (NFS) when there is a single lock server operating as the single authority on lock grants to NFS clients. The implementation of a cluster filesystem reduces the chances of a loss of service in the event a first server node fails, since a second server node takes over the responsibility of servicing clients formerly connected to the first server node. In the case where the same data is shared by multiple NFS server nodes in a cluster filesystem, the filesystem will not properly coordinate failover if any individual server node in the cluster filesystem suffers a failure, even though the cluster filesystem prevents locks from being granted during normal operation. Improper coordination of failover can occur in situations in which a server node in the cluster filesystem fails, because, as soon as the server node fails, all locks acquired by clients through that failed server node are released and can be acquired by a different client. However, a client that previously held a lock through the failed server node will not be notified of the failure (since that failed server node is now unavailable) and will continue to operate under the assumption that the client continues to hold the lock. For example, a first client, through a first server node in a cluster filesystem, acquires a first lock on a first data location. Then, the first server node fails, thereby releasing the first lock acquired by the first client. The first client continues to operate as if the first lock acquired via the failed first server is still valid. While the first client is operating as if the first lock is valid, a second client, through a second server node in the cluster filesystem, acquires a second lock on the first data location. The second client then modifies the data stored in the first data location. If the first client attempts to access the modified data stored in the first data location, the first client can fail or at least generate an error condition because the modified data does not have a value that the first client expects, (as a result of the second client modifying the data subsequent to the first client's last access of the first data location). Such a failure or error condition is likely to cause data corruption in the first client and/or the data stored in the data location, as well as other application-level issues resulting from multiple clients incorrectly being granted locks. When the cluster filesystem is operating normally, the locks ordinarily prevent inappropriate access and data corruption, but the failure of a server can render the locks ineffective in preventing such access.

To remedy the problem of inappropriate access in light of a server node failure, one embodiment coordinates the processing of lock requests among multiple server nodes, where the server nodes in a server cluster (e.g., a cluster filesystem) are notified of any locks granted by any other server nodes in the server cluster. Then, in the case of a failed server node, the other server nodes in the server cluster can access the lock status data (which indicates the status of the granted locks) belonging to the failed server node, transfer that lock status data to a designated backup node, and then continue normal processing after the recovery process is completed.

For example, according to one embodiment, a client, connected to a server node in a server cluster, sends a lock request to the server node. The lock request includes a request for exclusive access to a data location on a server storage device coupled to the server cluster. The server node, using a lock server, determines if granting the lock request is proper. The determination of whether the granting of the lock request is proper is discussed in more detail in conjunction with FIG. 1, FIG. 2A, and FIG. 2B. If the lock request grant is proper, the server node saves lock status data associated with the lock grant in a data structure. For example, the lock status data can include, but is not limited to, the locked data location within the server storage device, the identity of the client that requested and was granted the lock, and the like.

If a server node fails, at least one other server node in the server cluster will detect the failure, notify the other server nodes in the server cluster, and initiate a recovery process. First, the granting of new lock requests by, the lock servers, among the server nodes in the server cluster, is paused. A backup server node is then designated. According to one embodiment, the backup server node can be determined by the server cluster, or by a load balancing server or module separate from or part of the server cluster. One technique used for designating the backup server node is a round-robin assignment, in which each server node in the server cluster each takes a turn acting as a backup server node.

After the backup server node is designated, the backup server node determines if the failed server node stored any lock status data. As previously discussed, the lock status data identifies clients that have been granted locks on data stored in a data location in the server storage device. To preserve the granted locks and the integrity of the data stored in the data location, the lock status data from the failed server node is transferred to the backup server node. The lock status data (if any) in the backup server node is modified to include lock status data transferred from the failed server node. A reclaim notification is then sent from the backup server node to clients that were originally granted locks through the failed server node. The reclaim notification enables those clients to reclaim those locks through the backup server node. When the clients receive the reclaim notification, the client can reclaim those locks and proceed to process and/or otherwise access the data on the server storage device via the backup server.

As previously discussed, during the recovery process, the server cluster will temporarily deny any new lock requests to minimize the chance that a lock request for the same data location as one locked by a client through the failed server node will be processed and granted. One the recovery process has been completed, the server cluster resumes granting new lock requests.

An Example Server Node for Implementing Clustered Network File System Lock Management FIG. 1 is a simplified block diagram that illustrates certain features of a server node that can be used to communicate with clients and a server storage device. As will be appreciated, a server node is only one example of any number of computer systems that can be employed in implementing embodiments of the present invention. According to an embodiment of the present invention, server node 105, as illustrated, is implemented as a node in a server cluster (e.g., server cluster 315 of FIG. 3), which is further coupled to a server storage device (e.g., server storage device 325 of FIG. 3). Clients are coupled to the server cluster, and can access data stored on the server storage device as a result. To guard against data corruption of data stored in a particular data storage location in the server storage device, server node 105 implements a lock server 135 to manage incoming lock requests from clients coupled to server node 105. The lock requests include requests for access to data stored at a particular data storage location in the server storage device. However, when the server cluster is performing a failover recovery process in response to the failure of a server node, the server nodes in the server cluster (e.g., server node 105) temporarily deny or refuse the grant of any new lock requests until the failover recovery process is completed. Thus, in order to implement the aforementioned functions, server node 105 includes an operating system 110, a lock server 135, a failover agent 150, a cluster monitor 155, and lock status data 160, as illustrated in FIG. 1.

Operating system 110 acts as an interface between the hardware of server node 105 and a user. Operating system 110 controls the hardware of the computer system of server node 105, and allocates resources of the computer system to perform various functions such as, executing applications, performing system maintenance, and the like, for example. In one embodiment, operating system 110 is implemented using operating systems such as, Windows XP®, Windows Vista®, Linux, Mac OS X®, and the like, for example. As illustrated in FIG. 1, operating system 110 further includes kernel 115, which provides functionality for lower levels of operating system 110. Such lower levels include memory management, process and task management, disk management, mouse and keyboard management and the like.

Kernel 115 further includes a filesystem driver 120. Filesystem driver 120 is a kernel component that provides operating system 110 with access to a filesystem implemented on the server storage device. The filesystem enables the storage, organization, manipulation, and retrieval of data stored on the server storage device.

Lock refusal flag 130 is included in filesystem driver 125, and lock server 135 uses the status of lock refusal flag to determine whether the server nodes of the server cluster (e.g., server node 105) are temporarily refusing to grant new lock requests. According to an embodiment, lock server 135 sends a request to the filesystem via filesystem driver 120 to determine a status of lock refusal flag 130. According to an embodiment of the present invention, if lock refusal flag 130 is set, lock server 135 refuses to grant any new lock requests. Lock server 135 will grant new lock requests, if lock refusal flag 130 is not set (and the request is appropriate). In the alternative, as will be appreciated in light of the present disclosure, the clearing of lock refusal flag 130 can also be used to indicate that new lock requests are to be denied, with the setting of lock refusal flag 130 indicating that new lock requests are to be permitted.

Lock server 135, via a lock daemon 140 and a status daemon 145, handles lock requests and lock management. Lock daemon 140 can employ a network protocol such as, the Network Lock Manager (NLM) protocol, for example. Status daemon 145 can be implemented using a network protocol such as, the Network Status Monitor (NSM) protocol, for example. When in operation on server node 105, lock server 135 notifies the filesystem drivers in the other server nodes using, for example, a user-to-kernel interface of operating system 110. Such an interface can be implemented using an Input/Output Control (ioctl), which allows userspace modules or code to communicate with hardware devices or kernel components. The notification is tracked across the server cluster in order to identify which server nodes in the server cluster have active lock servers, and to maintain such information. The notifications are used during the operation of the server cluster in the event one of the server nodes with an active lock server becomes unavailable.

Lock daemon 140 monitors the server cluster for lock requests, unlock requests, and related messages. When lock daemon 140 receives a valid lock request from a client, lock daemon 140 determines whether lock server 135 is currently denying new lock requests. According to an embodiment of the present invention, lock daemon 140 queries the filesystem via filesystem driver 125 to check the status of lock refusal flag 130. Lock daemon 140 uses the status of lock refusal flag 130 to determine if server node 105 is temporarily refusing to grant new lock requests. Lock requests in such a system include an indication of whether the lock request is a new lock request or a reclaim lock request. A reclaim lock request is a type of lock request that is sent by a client that had previously acquired a lock from a server node that has become unavailable, (e.g., as a result of server node failure or other reason). In such a case, the designated backup server node notifies the client that the previously-acquired lock is available to be reclaimed via the backup server node. If the client determines that the previously-acquired lock should be reclaimed, the client sends a reclaim lock request. Reclaim lock requests are allowed by lock server 130 only when operating in "grace mode." Grace mode is a mode of operation that begins when lock server 130 is restarted and ends after a predetermined period of time. When not operating in grace mode, lock server 130 refuses reclaim lock requests.

Upon receipt of a lock request from a client (e.g., clients 105(1)-(N)), lock server 130 passes the lock request to filesystem driver, which determines whether the granting of the lock request is proper. The propriety of the lock request grant can be determined by, for example, determining whether another client has a lock on the same data location. According to an embodiment of the present invention, lock server 135 queries other lock servers implemented on other server nodes in the server cluster to determine if those lock servers have granted locks on the data storage location specified in the current lock request.

Failover agent 150, alone or in conjunction with cluster monitor 155, detects whether a server node in a server cluster has become unavailable. In the event that a server node has become unavailable, failover agent 150 coordinates the transfer of lock status data from a failed server node to a designated backup server node. Failover agent 150 also coordinates the termination and restart of lock servers implemented in the server nodes in the server cluster. The termination and restart of lock servers result in the server cluster temporarily denying new lock requests during failover recovery processing.

Cluster monitor 155 monitors the status of the server nodes in the server cluster. For example, cluster monitor 155 can monitor messages passed between server nodes in order to determine the server nodes' status. For example, in some embodiments, server nodes in a server cluster exchange periodic status messages, referred to as heartbeat messages. If a heartbeat message from a particular server node is not received at an expected period of time, that particular server node may have become unavailable.

Lock status data 160 includes data describing the status of a lock granted to a client. For example, the lock status data can include, but is not limited to, the locked data location within the server storage device, the identity of the client that requested and was granted the lock, and the like. Lock status data 160 is maintained by status daemon 145 of lock server 145.

Figure 2A:
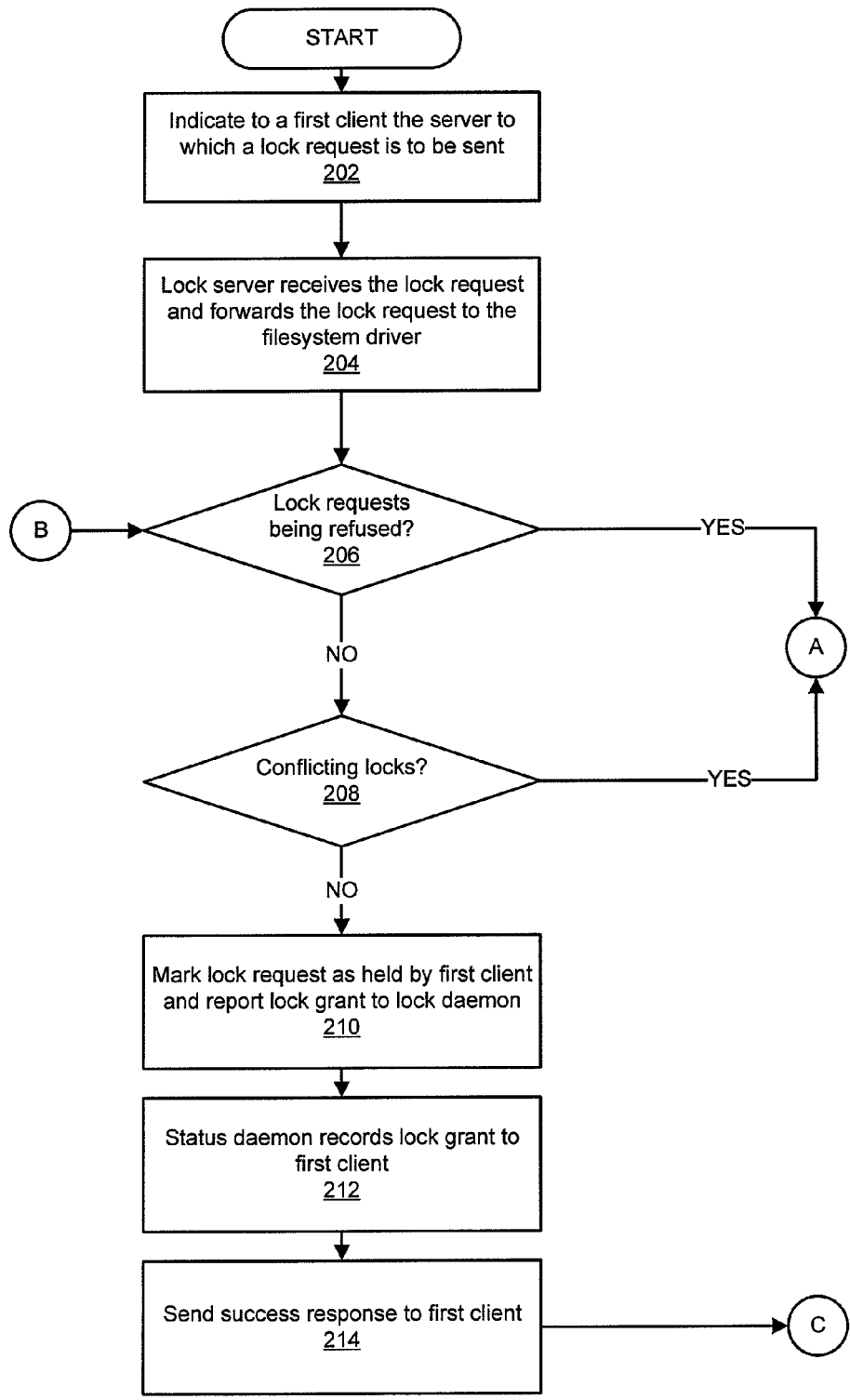
FIG. 2A and FIG. 2B illustrate a method for processing lock requests on data stored in a server storage device, according to one embodiment.
Figure 2B:
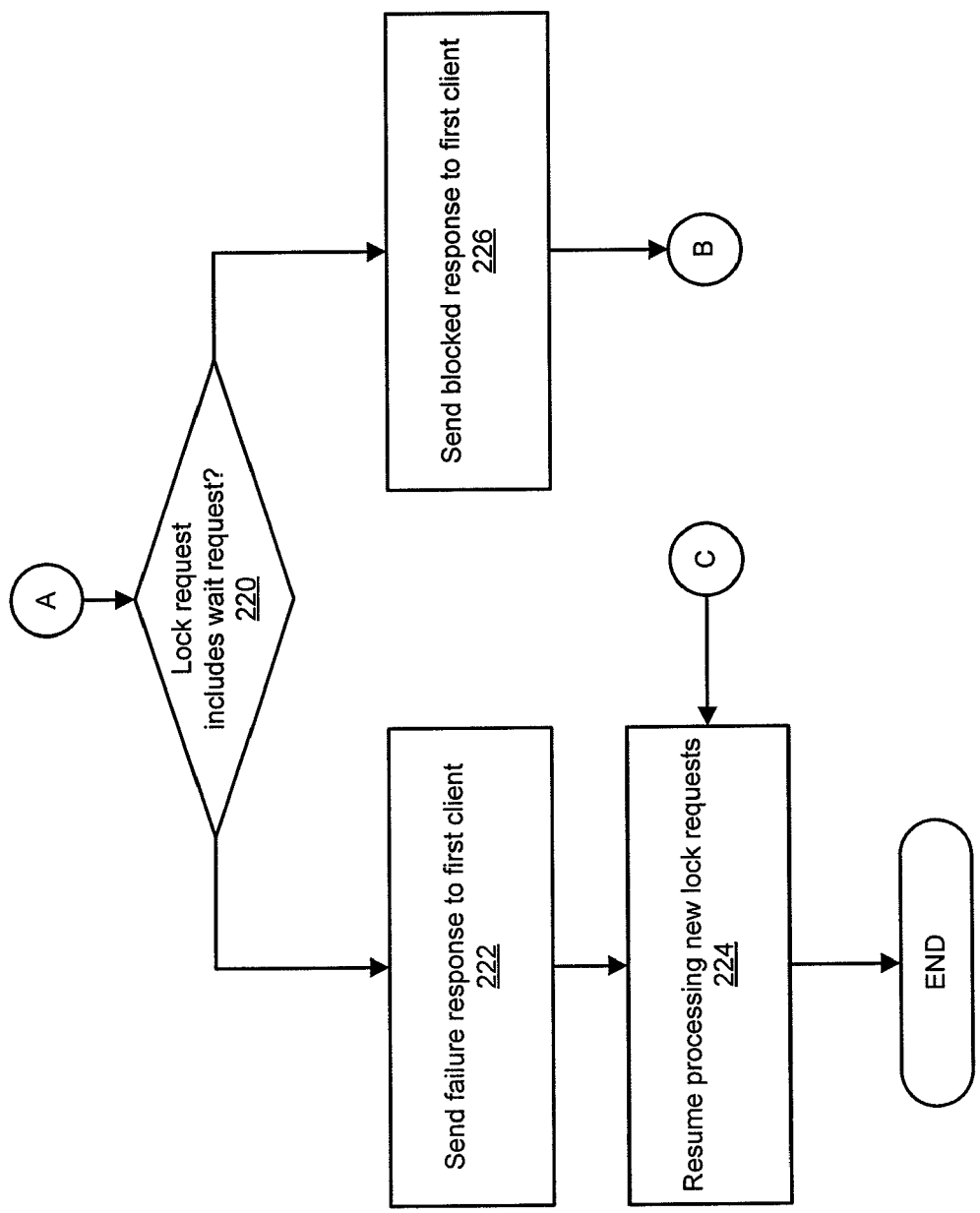
Figure 2C:
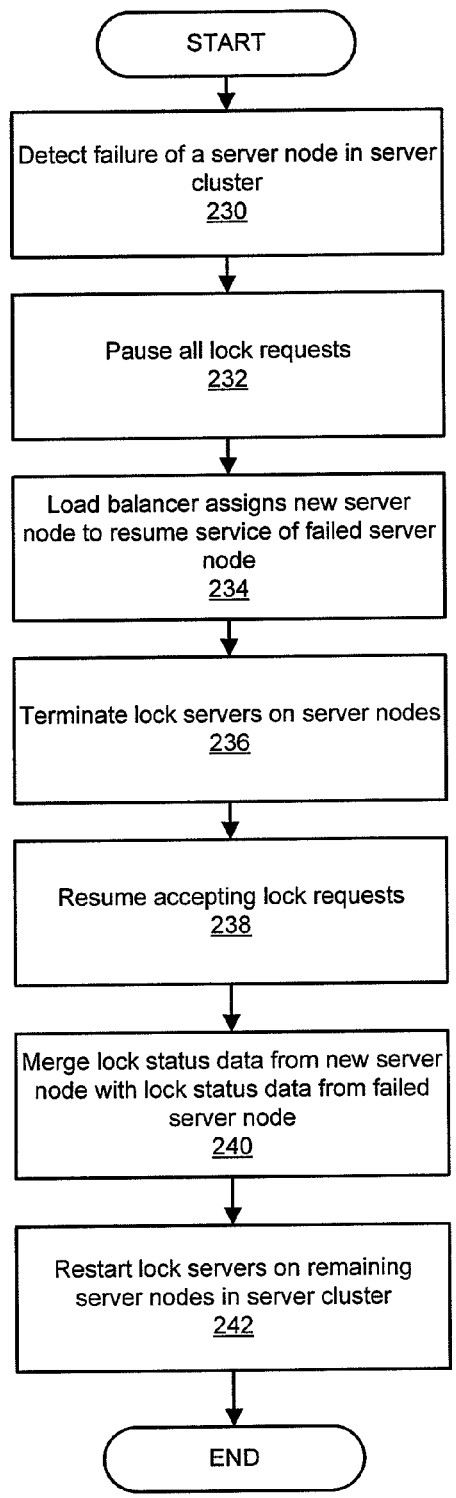
FIG. 2C illustrates a method for processing server node failover while preserving granted locks on data stored in a server storage device, according to one embodiment.

An Example Method for Implementing Clustered Network File System Lock Management FIG. 2A and FIG. 2B are flowcharts illustrating a method for processing lock requests on data stored on a server storage device, according to one embodiment. Accordingly, FIG. 2C is a simplified flowchart illustrating a method for failover recovery processing, according to one embodiment.

Figure 3:
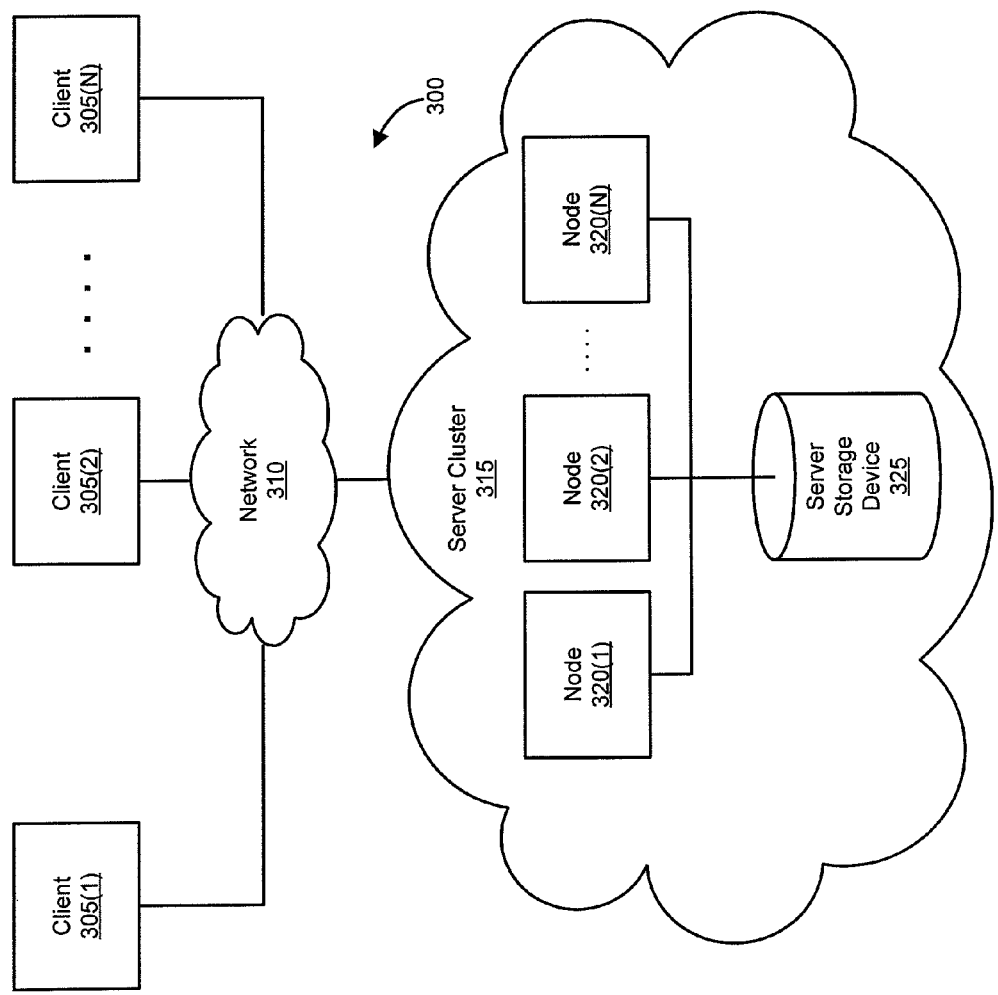
FIG. 3 is an example network architecture in which one embodiment can be implemented.

Referring once again to FIG. 2A, the process begins with an indication being sent to a client (e.g., client 305(1) of FIG. 3) by a system such as a server cluster (e.g., server cluster 315 of FIG. 3), which includes a collection of server nodes. The indication indicates the server node (e.g., server node 320(1) of FIG. 3) to which the client is to send a lock request (202). According to one embodiment of the present invention, the server cluster determines the server node to service the lock request using a load-balancing technique, such as, for example, round-robin domain name server (DNS).

Round-robin DNS is a load-balancing technique in which the load-balancing function is placed in a DNS server, instead of being implemented as a dedicated load-balancing server or module. Round robin DNS works on a rotating basis, in which one server node of the server cluster is assigned to perform a function. Then, the assigned server node will not be assigned to perform a subsequent function until all of the other server nodes have been assigned. For example, if a server cluster has three server nodes, a first server node is assigned to perform a first task. A second server node is then assigned to perform a second task. Subsequently, a third server node is assigned to perform a third task. To perform a fourth task, the first server node of the server cluster is assigned once again, as all of the other server nodes have already been assigned a task. It will be appreciated that the load-balancing function can be performed by the DNS server, by a dedicated load-balancing server, or by the server nodes themselves.

Returning to FIG. 2A, the lock server (e.g., lock server 135 of FIG. 1) of the assigned server node receives the lock request from the client and forwards the lock request to a filesystem driver (e.g., filesystem driver 125 of FIG. 1)(204). The lock server determines if new lock requests are being refused (206). According to one embodiment, the lock server determines if new lock requests are being refused by sending a message to the filesystem via the filesystem driver to determine the status of a lock refusal flag (e.g., lock refusal flag 130 of FIG. 1). The lock refusal flag is set by the filesystem driver in order to deny the granting of new lock requests to clients in the event of a server node failover recovery, as discussed in conjunction with FIG. 2C.

If the lock refusal flag is set, the process continues (connector A), as illustrated in FIG. 2B. If the lock refusal flag is not set, the lock server determines if any granted lock requests would conflict with the current lock request, (208). According to one embodiment, the lock daemon (e.g., lock daemon 140 of FIG. 1) or the cluster monitor (e.g., cluster monitor 155 of FIG. 1) communicates with other lock servers implemented in other server nodes in the server cluster via the filesystem driver, in order to determine if another client has already been granted a lock on the particular storage location indicated in the current lock request. The determination can be performed by accessing lock status data (e.g., lock status data 160 of FIG. 1) of each server node of the server cluster, or by querying the lock servers of the server nodes. If another client has already been granted a lock, the process continues (connector A), as illustrated in FIG. 2B.

If there are no conflicting granted lock requests, the filesystem driver marks the lock request as held (granting the lock request) and reports the lock grant to a lock daemon (210). The lock daemon notifies a status daemon (e.g., status daemon 145 of FIG. 1) of the granted lock and the status daemon associates the granted lock with the first client and records the association in a collection of lock status data (e.g., lock status data 160 of FIG. 1) (212). The lock server then notifies the first client of the successful lock grant (214). The process then continues (connector C), as is illustrated in FIG. 2B.

Referring once again to FIG. 2B, if the lock requests are being refused or if the lock request currently requests a lock on a data storage location locked by another client, the filesystem driver determines if the lock request includes a wait request (220). According to an embodiment of the presentation, a wait request is included in a lock request so that the client need not resend the lock request, in the event that processes illustrated in FIG. 2A result in the lock request being refused (lock requests being refused (206) or the lock request includes a request for a lock on a data storage location that is already locked by another client (208). If the lock request does not include a wait request, the lock server sends a failure response to the first client (222). The server cluster then resumes processing of new lock requests (224). If the lock request does not include a wait request, the filesystem driver sends a "blocked" response (226). The "blocked" response prompts the client to resend the lock request, if necessary.

Referring now to FIG. 2C, a flowchart illustrating a method for processing server node failover while preserving granted lock requests on data stored in a server storage device, according to one embodiment, is provided. According to an embodiment of the present invention, the failover agent is notified by the filesystem driver of the server nodes in the server cluster that have an active lock server. If one of the server nodes with an active lock server becomes unavailable, the failover agent initiates and performs a failover recovery process to transfer lock status data from the failed server node to a designated backup server node.

The process of FIG. 2C begins with a failover agent (e.g., failover agent 150 of FIG. 1) detecting the failure of a server node in a server cluster (220). The failure of a server node can be determined by the failover agent or a cluster monitor (e.g., cluster monitor 155 of FIG. 1), for example. In response to detecting the failure, the failover agent temporarily pauses the granting of new lock requests by the server nodes in the server cluster (232). According to an embodiment of the present invention, the failover agent sets the lock refusal flag in the kernel to indicate that the server nodes are temporarily denying any new lock requests from clients during the failover recovery process.

Then, through a load-balancing procedure, a backup server node is assigned to take over the responsibilities of the failed server node (234). According to an embodiment of the present invention, the backup server node is selected using load-balancing procedure, (e.g., round-robin DNS). It will be appreciated that the load-balancing procedure can be performed by a dedicated load-balance server or a load-balance module implemented in the server nodes, for example.

To reset the lock servers among the server nodes, the failover agents in the server nodes terminate the operation of the lock servers (236). After the lock servers are reset, the failover agent clears the lock refusal flag to resume the processing of new lock requests (238). The failover agent accesses existing lock status data in the failed server node and merges that lock status data with the lock status data located in the designated backup node (240). Thus, if a client was originally granted a lock request through the failed server node, the transfer of the lock status data enables the designated backup server node to handle the locks granted to the client, after the failover recovery process has completed. Finally, after the failover recovery process has completed, the failover agents in the remaining server nodes restart their respective lock servers in order to process incoming lock requests (242).

An Example Architecture for Clustered Network File System Lock Management

Elements of the system can be implemented using a variety of computer systems and networks. FIG. 3 is a simplified block diagram illustrating a network architecture 300 in which one or more clients are provided access to a server via various network connections. As depicted in FIG. 3, clients 305(1)-(N) are coupled to a network 310, and so are able to access a server cluster 315 via network 310. A client can be implemented using, for example, a desktop computer, a laptop computer, a workstation, a server, a cell phone, a smart phone, a network-enabled personal digital assistant (PDA), or the like. An example of network 310, which can be used by clients 305(1)-305(N) to access server cluster 315, is the Internet. Alternatively, access to server 315 can be provided by a local-area network (LAN) utilizing Ethernet, IEEE 802.11x, or some other communications protocol. As will be appreciated, server cluster 315 can be accessed by clients coupled directly thereto (not shown).

Server cluster 315 includes multiple server nodes 320(1)-(N), which are further coupled to server storage device 325. Multiple server nodes 320(1)-(N) receive and service data access requests to server storage device 325 from clients 305(1)-(N). It is understood that multiple server nodes 320(1)-(N) service data access requests (such as lock requests) in a way that balances the load of data access requests across multiple server nodes 320(1)-(N).

Server storage device 325 can be, for example, a hard disk, a compact disc (CD), a digital versatile disc (DVD), or other mass storage device, or a storage system (e.g., a redundant array of independent disks (RAID) system or an optical storage jukebox) that includes an array of such devices. Server storage device 325 can include logical volumes that are implemented on an underlying physical storage device (e.g., a RAID system). Those with skill in the art will appreciate that the storage, organization, manipulation, and retrieval of data on server storage device 325 can be implemented with a filesystem such as, for example, various versions of file allocation table (FAT), new technology file system (NTFS), high-performance file system (HPFS), hierarchical file system (HFS), and the like.

Server storage device 325 can also be implemented as a storage area network (SAN), which couples remote storage devices to server nodes 320(1)-(N), such that the remote storage devices appear as locally-attached storage devices to the server nodes' 320(1)-(N) operating system, for example. Alternatively, those of skill in the art will also appreciate, in light of the present disclosure that network architecture 300 can include other components such as routers, firewalls, and the like that are not germane to the discussion of the present network architecture and will not be discussed further herein.

For example, clients 305(1)-(N) can be directly coupled to server cluster 315 without the use of network 310.

An example of a computing environment that can be used to implement embodiments of the present invention is described below with reference with FIG. 4.

Figure 4:
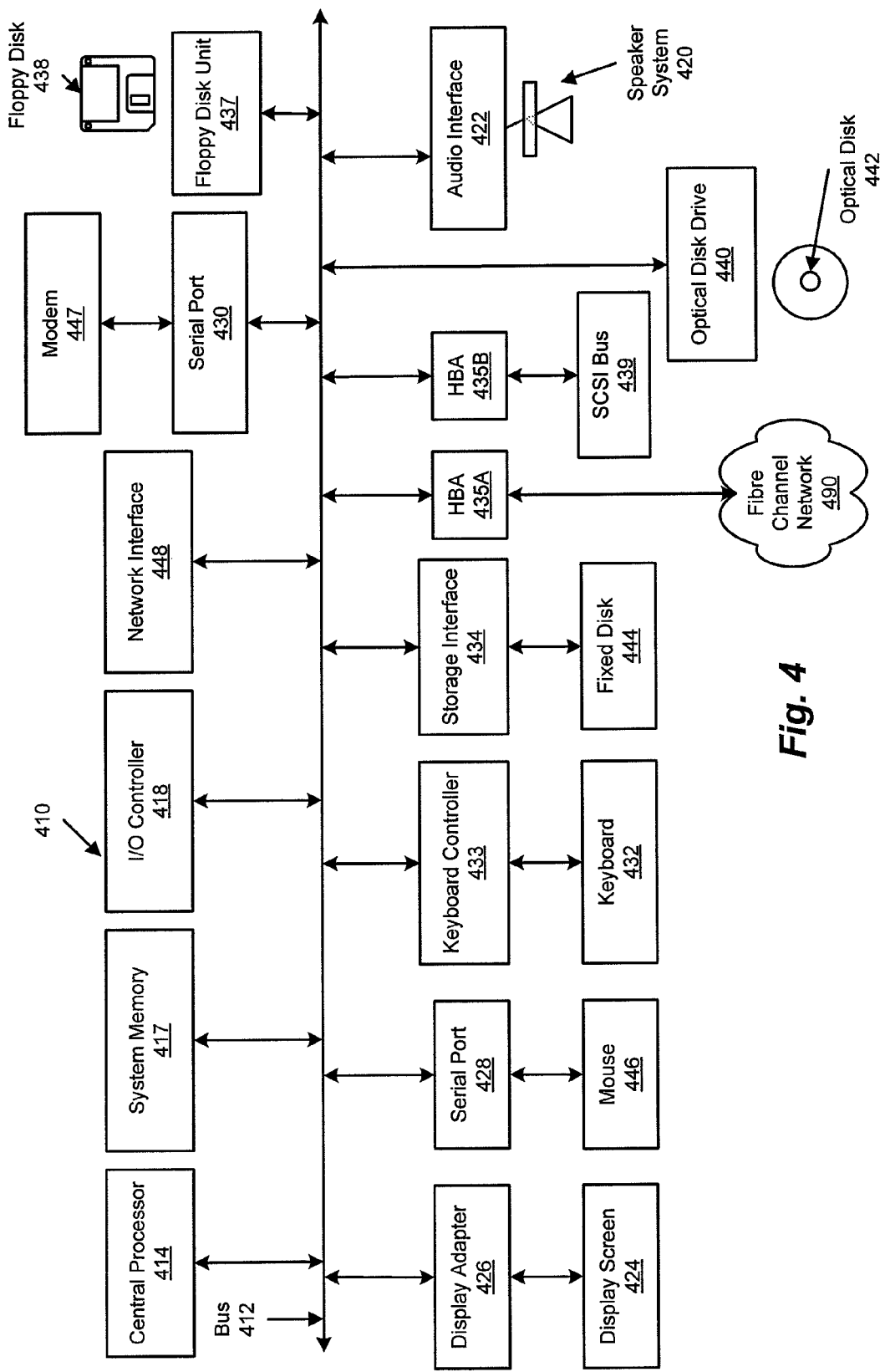
FIG. 4 is a block diagram that illustrates an example of a computer system suitable for implementing embodiments of the present invention.

FIG. 4 depicts a block diagram of a computer system 410 suitable for implementing a server (e.g., server 120 of FIG. 1) as well as the clients (e.g., clients 105(1)-(N) of FIG. 1). Computer system 410 includes a bus 412 which interconnects major subsystems of computer system 410, such as a central processor 414, a system memory 417 (typically random-access memory (RAM), but which may also include read-only memory (ROM), flash ROM, or the like), an input/output controller 418, an external audio device, such as speaker system 420 via an audio output interface 422, an external device, such as a display screen 424 via display adapter 426, serial ports 428 and 430, a keyboard 432 (interfaced with keyboard controller 433), a storage interface 434, a floppy disk drive 437 operative to receive a floppy disk 438, a host bus adapter (HBA) interface card 435A operative to connect with a Fibre Channel network 490, a host bust adapter (HBA) interface card 435B operative to connect to a SCSI bus 439, and an optical disk drive 440 operative to receive an optical disk 442. Also included are a mouse 446 (or other point-and-click device, coupled to bus 412 via serial port 428), a modem 447 (coupled to bus 412 via serial port 430), and a network interface 448 (coupled directly to bus 412).

Bus 412 allows data communication between central processor 414 and system memory 417, which may include read-only memory (ROM) or flash memory (neither shown) and random access memory (RAM) (not shown), as previously noted. RAM is generally the main memory into which operating system and application programs are loaded. ROM or flash memory can contain, among other code, the Basic Input-Output system (BIOS) which controls basic hardware operation such as the interaction with peripheral components. Applications resident with computer system 410 are generally stored on and accessed via a computer-readable medium, such as hard disk drive (e.g., fixed disk 444), an optical drive (e.g., optical drive 440), a floppy disk unit 437, or other storage medium.

Storage interface 434, as with other storage interfaces of computer system 410, can connect to a standard computer-readable medium for storage and/or retrieval of information, such as a fixed disk drive 444. Fixed disk drive 444 may be a part of computer system 410 or may be separate and accessed through other interface systems. Modem 447 may provide a direct connection to a remote server via a telephone link or to the Internet via an internet service provider (ISP). Network interface 448 may provide a direct connection to a remote server via a direct network link to the Internet via a point-of-presence (POP). Network interface 448 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras, and so on). Conversely, all of the devices shown in FIG. 4 need not be present. The devices and subsystems can be interconnected in different ways from that shown in FIG. 4. The operation of the computer system such as that shown in FIG. 4 is readily known in the art and is not discussed in detail in this application. Code to implement the previously-described features can be stored in computer-readable storage media such as one or more of system memory 417, fixed disk 444, optical disk 442, or floppy disk 438. The operating system provided on computer system 410 may be MS-DOS®, MS-WINDOWS®, OS/2®, UNIX®, Linux®, or other known operating system.

As an example implementation of computer system 410, server node 105 of FIG. 1 can store operating system 110, lock server 135, failover agent 150, cluster monitor 155, and lock status data, all of FIG. 1, in computer-readable storage media (e.g., memory 417 and the like). Also, network interface 448 may be used by any of the modules described in server node 105 to communicate with clients (e.g., clients 305(1)-(N) of FIG. 3) or other server nodes. For example, failover agent 150 and cluster monitor 155 can send an receive status messages with other server nodes in a server cluster (e.g., server cluster 315 of FIG. 3). The status messages (or lack thereof) can be used to determine whether or not failover recovery processing is necessary.

Moreover, regarding the messages and/or data signals described herein, those skilled in the art will recognize that a signal may be directly transmitted from a first block to a second block, or a signal may be modified (e.g., amplified, attenuated, delayed, latched, buffered, inverted, filtered, or otherwise modified) between the blocks. Although the signals of the above described embodiment are characterized as transmitted from one block to the next, other embodiments may include modified signals in place of such directly transmitted signals as long as the informational and/or functional aspect of the signals is transmitted between the blocks. To some extent, a signal input at a second block may be conceptualized as a second signal derived from a first signal output from a first block due to the physical limitations of the circuitry involved (e.g., there will inevitably be some attenuation and delay). Therefore, as used herein, a second signal derived from the first signal includes the first signal or any modifications to the first signal, whether due to circuit limitations or due to passage through other circuit elements which do not change the informational and/or final functional aspect of the first signal.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A method comprising:
   detecting a failure of a first server node of a plurality of server nodes, wherein
      the first server node comprises
         a first set of lock status data associated with a first lock, and
      the first lock grants a first client of a plurality of clients exclusive access to data stored on a server storage device;
   in response to the detecting,
      transferring the first set of lock status data to a second server node of the plurality of server nodes, and
      refusing lock requests from at least one of the plurality of clients, wherein
         the lock requests are sent to the plurality of server nodes, and
         the plurality of server nodes implement a plurality of lock servers, and
      terminating operation of the plurality of lock servers;
   sending a reclaim notification to the first client from the second server node, wherein the reclaim notification informs the first client that the
first server node is unavailable;
receiving a reclaim lock request from the first client; and
in response to the receiving of the reclaim lock request,
granting, to the first client, the first lock, wherein
the granting is based on the reclaim lock request.

2. The method of claim 1, wherein
the plurality of lock servers comprise at least one lock server other than a lock server of the first server node, and
further comprising:
after the terminating,
restarting the plurality of lock servers, and
accepting other lock requests from the plurality of clients.

3. The method of claim 1, further comprising:
receiving a lock request for access to data stored on the server storage device, wherein the lock request is sent by the first client of the plurality of clients;
in response to receiving the lock request, assigning the first set of lock status data to the first client, wherein
the first set of lock status data is assigned by a lock server, and
the lock server is implemented by the first server node; and
in response to the assigning, sending a notification of an active lock server to the plurality of server nodes.

4. The method of claim 1, wherein
the lock requests are sent by the plurality of clients.

5. The method of claim 1, wherein the plurality of server nodes implement a cluster filesystem.

6. The method of claim 1, further comprising:
merging the first set of lock status data with a second set of lock status data, wherein
the merging is performed after the terminating operation of the plurality of lock servers and before the sending the reclaim notification,
the merging is performed before restarting the plurality of lock servers,
the second set of lock status data grants a second client of the plurality of clients exclusive access to data stored on the server storage device, and
the second set of lock status data is stored in the second server node.

7. A computer system, comprising:
at least one processor;
a non-transitory computer-readable storage medium coupled to the at least one processor; and
computer code, encoded in the computer-readable storage medium, configured to cause the at least one processor to
detect a failure of a first server node of a plurality of server nodes, wherein
the first server node comprises
a first set of lock status data, wherein
the first set of lock status data is configured to provide a grant of a first client of a plurality of clients exclusive access to data stored on a server storage device,
responsive to the detecting,
transfer the first set of lock status data to a second server node of the plurality of server nodes, and
refuse lock requests from at least one of the plurality of clients, wherein
the lock requests are sent to the plurality of server nodes, and
the plurality of server nodes implement a plurality of lock servers, and
terminate operation of the plurality of lock servers,
send a reclaim notification to the first client from the second server node, wherein
the reclaim notification informs the first client that the first server node is unavailable,
receive a reclaim lock request from the first client, and
responsive to the receiving,
grant, to the first client, the exclusive access to the data stored on the server storage device, wherein
the granting is based on the reclaim lock.

8. The computer system of claim 7, wherein
the plurality of lock servers comprise at least one lock server other than a lock server of the first server node, and
wherein the computer code is further configured to cause the at least one processor to after the terminating,
restart the plurality of lock servers, and
accept other lock requests from the plurality of clients.

9. The computer system of claim 7, wherein the computer code is further configured to cause the at least one processor to
receive a lock request for access to data stored on the server storage device, wherein the lock request is sent by the first client of the plurality of clients;
responsive to receiving the lock request, assign the first set of lock status data to the first client, wherein
the first set of lock status data is assigned by a lock server, and
the first server is implemented by the first server node; and
responsive to the assigning, send a notification of an active lock server to the plurality of server nodes.

10. The computer system of claim 7, wherein
the lock requests are sent by the plurality of clients.

11. The computer system of claim 7, wherein the plurality of server nodes implement a cluster filesystem.

12. The computer system of claim 7, wherein the computer code is further configured to cause the at least one processor to
merge the first set of lock status data with a second set of lock status data, wherein
the merging is performed after the terminating operation of the plurality of lock servers and before the sending a reclaim notification,
the merging is performed before restarting the plurality of lock servers,
the second set of lock status data grants a second client of the plurality of clients exclusive access to data stored on the server storage device, and
the second set of lock status data is stored in the second server node.

13. A non-transitory computer-readable storage medium comprising computer code, when executed, the computer code is configured to cause a processor to
detect a failure of a first server node of a plurality of server nodes, wherein
the first server node comprises
a first set of lock status data, wherein
the first set of lock status data is configured to provide a grant of a first client of a plurality of clients exclusive access to data stored on a server storage device;
responsive to the detecting,
transfer the first set of lock status data to a second server node of the plurality of server nodes, and refuse lock requests from at least one of the plurality of clients, wherein
the lock requests are sent to the plurality of server nodes, and
the plurality of server nodes implement a plurality of lock servers, and
terminate operation of the plurality of lock servers;
send a reclaim notification to the first client from the second server node, wherein
the reclaim notification informs the first client that the first server node is unavailable;
receive a reclaim lock request from the first client; and
responsive to the receiving,
grant, to the first client, the exclusive access to the data stored on the server storage device, wherein
the granting is based on the reclaim lock request.

14. The non-transitory computer-readable storage medium of claim 13, wherein
the plurality of lock servers comprise at least one lock server other than a lock server of the first server node, and
wherein the computer code, when executed, is further configured to cause the processor to
after the refusing,
restart the plurality of lock servers, and
accept lock requests from the plurality of clients.

15. The non-transitory computer-readable storage medium of claim 13, wherein the computer code, when executed, is further configured to cause the processor to
receive a lock request for access to data stored on the server storage device, wherein the lock request is sent by the first client of the plurality of clients;
responsive to receiving the lock request, assign the first set of lock status data to the first client, wherein
the first set of lock status data is assigned by a lock server, and
the first server is implemented by the first server node; and
responsive to the assigning, send a notification of an active lock server to the plurality of server nodes.

16. The non-transitory computer-readable storage medium of claim 13, wherein
the lock requests are sent by the plurality of clients.

17. The non-transitory computer-readable storage medium of claim 13, wherein the plurality of server nodes implement a cluster filesystem.

18. The non-transitory computer-readable storage medium of claim 13, wherein the computer code, when executed, is further configured to cause the processor to
merge the first set of lock status data with a second set of lock status data, wherein
the merging is performed after the terminating operation of the plurality of lock servers and before the sending the reclaim notification,
the merging is performed before restarting the plurality of lock servers,
the second set of lock status data grants a second client of the plurality of clients exclusive access to data stored on the server storage device, and
the second set of lock status data is stored in the second server node.

* * * * *